March 20, 1945.    G. L. DIMMICK    2,371,611
REDUCTION IN REFLECTION FROM GLASS
Filed Feb. 28, 1942
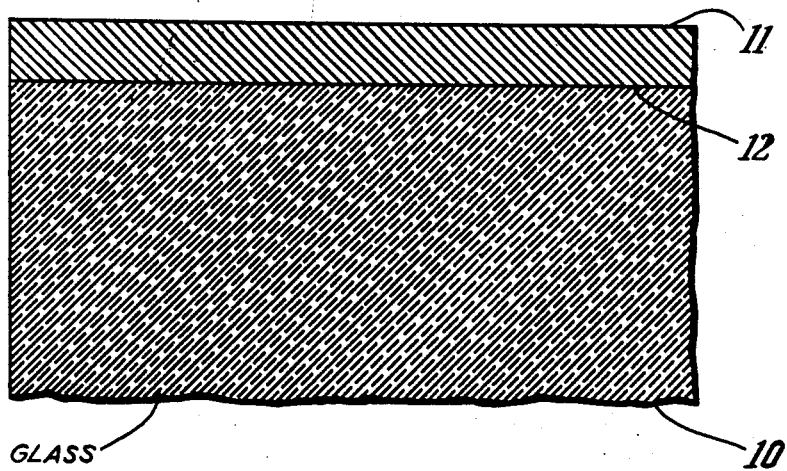
Inventor
*Glenn L. Dimmick*
By
*C. D. Tuska*
Attorney Patented Mar. 20, 1945

2,371,611

UNITED STATES PATENT OFFICE 2,371,611

REDUCTION IN REFLECTION FROM GLASS

Glenn L. Dimmick, Indianapolis, Ind., assignor to Radio Corporation of America, a corporation of Delaware Application February 28, 1942, Serial No. 432,836

10 Claims. (Cl. 88—1)

This invention relates to a reflection reducing coating for the surface of glass or similar materials, and is an improvement on the subject matter of my copending application Serial No. 408,807, filed August 29, 1941, now Patent 2,352,085, issued June 20, 1944.

It has been known for some time that if an optical medium, such as glass, were coated with transparent material having a thickness of an odd number of quarter wave lengths of light and an index of refraction approaching the square root of that of the optical medium, the surface reflection for light of the wave length from which the thickness of the coating was computed would be reduced to a minimum.

Various materials have been proposed for such coatings including, for example, the fatty acid salts of the alkali earths and the fluorides of some of the alkali earths. In my application Serial No. 348,815, filed July 31, 1940, now Patent 2,338,233, issued January 4, 1944, I disclosed the fact that a mixture of calcium fluoride and aluminum oxide produced a coating approaching the optical properties of calcium fluoride but having far more desirable mechanical properties in that the coating was more adherent and more resistant to abrasion than those heretofore known. In my application Serial No. 408,807, filed August 29, 1941, I disclosed an improved coating material consisting of the mineral gearksutite, which will be hereinafter described in more detail.

The present invention pertains to an improved coating which is both optically and mechanically superior to that of my earlier filed applications in that the material more nearly approaches the required optical conditions, is extremely hard and tenacious, and provides a very slippery surface which tends to reduce the probability of mechanical damage.

These ends are accomplished by the use of the eutectic mixture of calcium fluoride and aluminum fluoride with a small amount of aluminum oxide added to control the adhesion of the material to the evaporating device.

One object of the invention is to provide an improved reflection reducing coating for optical elements.

Another object of the invention is to provide an improved coating for glass which will adhere thereto with greater tenacity than the coatings heretofore known.

Another object of the invention is to provide a reflection reducing coating for optical media which is permanent and not readily damaged.

Other and incidental objects of the invention will be apparent to those skilled in the art from a reading of the following specification and a consideration of the accompanying drawing, in which the single figure represents a reflection reducing coating 11, according to the present invention, as applied to the surface 12 of a piece of glass 10.

The mineral gearksutite has the formula $CaF_2.Al(F,OH)_3H_2O$ and occurs naturally in Greenland and in Colorado. The index of refraction of the material along the several crystal axes is between 1.45 and 1.46 and the index of refraction of the evaporated material is approximately 1.35.

When a quarter wave length film of this material is evaporated on glass of index 1.517 the reflected light is reduced to approximately twenty percent of its original value. This evaporation is accomplished in a coiled filament or in an appropriate boat in appropriate relation to the surface to be coated in an evacuated chamber.

The surface friction of this evaporated film is extremely low, which is a distinct advantage as it makes it more difficult to scratch the film when wiping the surfaces. Another advantage of the particular material is that it acts as its own "getter" during the process of evaporation. In the evaporation of the prior materials, such as calcium fluoride or the mixture of calcium fluoride and aluminum oxide above referred to, it is necessary to obtain a vacuum of about 0.2 micron mercury column in order to evaporate a hard uniform film. In the evaporation of gearksutite the evaporation may be started at a pressure of approximately 0.6 micron and the pressure then immediately falls to approximately two-tenths of a micron as soon as the gearksutite begins to boil. The cause of this action is not known, but it results in cutting the evaporating time in less than half, as in the ordinary procedure, using a large oil molecular pump with an oil forepump, it requires from ten to fifteen minutes to accomplish this same pressure reduction.

The mineral gearksutite is not found in large quantities in sufficiently good quality for optical purposes, and it is correspondingly desirable to provide a material which may be produced synthetically from pure substances and which will be of better quality and more uniform controllability.

I have discovered that if calcium fluoride and aluminum fluoride are mixed in any percentage between the limits of 30 percent calcium fluoride and 70 percent aluminum fluoride, and 70 percent calcium fluoride and 30 percent aluminum fluoride, a satisfactory film may be obtained. This mixture, however, within these limits, does not satisfactorily adhere to the evaporating device which is preferably a metallic boat. I have found that adding a small amount of aluminum oxide to the mixture causes the fused mixture to lie down in the boat without sticking to it, and thereby improves the evaporation of the mixture. The percentage of aluminum oxide may be anywhere between 5 percent and 12 percent, although a quantity as low as 1 percent is useful. Inasmuch as 5 percent of aluminum oxide is sufficient to change the surface tension by the required amount, and the aluminum oxide does not appear to enter into the coating, I prefer to keep the amount thereof to this value.

Insofar as I have been able to ascertain, the calcium and aluminum fluorides evaporate in the proportions of their eutectic mixture regardless of the proportions in which these materials are combined within the limits stated above. This eutectic mixture apparently consists of equal molecular parts of the two materials. The mixture which I prefer to use, therefore, includes 45½ percent by weight of calcium fluoride, 49½ percent by weight of aluminum fluoride, and 5 percent by weight of aluminum oxide.

In preparing this mixture, it is desirable to eliminate all volatile material, as otherwise the proper percentages are not secured. I accordingly heat each of the three materials separately in a carbon crucible to a temperature of substantially 1000° C. in air. The materials are then repowdered and the powders mixed in the ratios given above.

I have discovered that an appropriate boat for the evaporation of the material can be made from an alloy of 50 percent iron and 50 percent nickel. A sheet of this material having a thickness of .005 inch may be folded into a V-shaped boat which will hold the required amount of material for a single operation. Other materials are not so satisfactory for the boat, as the coated mixture does not wet them sufficiently to cause the material to properly contact the walls and to provide the maximum area for evaporation. The alloy just stated is sufficiently wetted by the fused mixture so that proper contact is had with the mixture and the maximum surface area for evaporation is available. In addition, the mixture does not adhere so tightly to the boat that the residue cannot be readily removed after the conclusion of the operation.

I claim as my invention:

1. An optical element having a refracting surface and a reflection reducing coating thereon having a thickness of approximately one-quarter wave length of the light for which maximum reflection reduction is to be produced and comprising evaporated and deposited calcium fluoride-aluminum fluoride eutectic.

2. An optical element having a refracting surface and a reflection reducing coating thereon having a thickness of approximately one-quarter wave length of the light for which maximum reflection reduction is to be produced and consisting of the evaporation product of a mixture of calcium fluoride, aluminum fluoride and aluminum oxide.

3. An optical element having a refracting surface and a reflection reducing coating thereon having a thickness of approximately one-quarter wave length of the light for which maximum reflection reduction is to be produced and comprising an evaporated and deposited mixture of calcium fluoride and aluminum fluoride in substantially molecular proportions.

4. An optical element having a refracting surface and a reflection reducing coating thereon having a thickness of approximately an odd number of quarter wave lengths of the light for which maximum reflection reduction is to be produced and comprising the evaporation product of a mixture of 70 percent to 30 percent calcium fluoride and 30 percent to 70 percent aluminum fluoride.

5. An optical element having a refracting surface and a reflection reducing coating thereon having a thickness of approximately one-quarter wave length of the light for which maximum reflection reduction is to be produced and consisting of the evaporation product of a mixture of 70 percent to 30 percent calcium fluoride, 30 percent to 70 percent aluminum fluoride and 1 percent to 12 percent aluminum oxide.

6. An optical element having a refracting surface and a reflection reducing coating thereon having a thickness of approximately an odd number of quarter wave lengths of the light for which maximum reflection reduction is to be produced and comprising the evaporation product of a mixture of approximately 91 parts of calcium fluoride and approximately 99 parts of aluminum fluoride.

7. The method of producing a reflection-reducing coating on an optical surface including the step of evaporating a coating material consisting of calcium fluoride, aluminum fluoride and aluminum oxide from a boat consisting of an alloy of substantially equal parts of iron and nickel.

8. The method of producing a reflection-reducing coating on an optical surface including the step of evaporating a coating material consisting of equal molecular proportions of calcium fluoride and aluminum fluoride and a small portion of aluminum oxide from a boat consisting of an alloy of substantially equal parts of iron and nickel.

9. The method of producing a reflection-reducing coating on an optical surface including the step of evaporating a coating material consisting of substantially 91 parts of calcium fluoride, substantially 99 parts of aluminum fluoride, and about 10 parts of aluminum oxide from a boat consisting of an alloy of substantially equal parts of iron and nickel.

10. An optical element having a refracting surface and a reflection reducing coating thereon having a thickness of one-quarter wave length of the light for which maximum reflection reduction is to be produced and consisting of the evaporation product of a mixture of 91 parts of calcium fluoride, 99 parts of aluminum fluoride and 10 parts of aluminum oxide.

GLENN L. DIMMICK.